(12) United States Patent
Subervie et al.

(10) Patent No.: US 11,408,270 B2
(45) Date of Patent: Aug. 9, 2022

(54) WELL TESTING AND MONITORING

(71) Applicant: Sensia LLC, Houston, TX (US)

(72) Inventors: Yves-Marie Clet Robert Subervie, Houston, TX (US); Dudi Abdullah Rendusara, Singapore (SG); Roderick Ian MacKay, London (GB)

(73) Assignee: Sensia LLC, Houston, TX (US)

( * ) Notice: Subject to any disclaimer, the term of this patent is extended or adjusted under 35 U.S.C. 154(b) by 29 days.

(21) Appl. No.: 15/035,722

(22) PCT Filed: Nov. 13, 2014

(86) PCT No.: PCT/US2014/065372
§ 371 (c)(1),
(2) Date: May 10, 2016

(87) PCT Pub. No.: WO2015/073626
PCT Pub. Date: May 21, 2015

(65) Prior Publication Data
US 2016/0265341 A1    Sep. 15, 2016

Related U.S. Application Data

(60) Provisional application No. 61/903,952, filed on Nov. 13, 2013, provisional application No. 61/903,947, (Continued)

(51) Int. Cl.
*E21B 47/008* (2012.01)
*F04D 15/00* (2006.01)
(Continued)

(52) U.S. Cl.
CPC ............ *E21B 47/008* (2020.05); *E21B 43/12* (2013.01); *E21B 43/128* (2013.01);
(Continued)

(58) Field of Classification Search
CPC .... E21B 47/0007; E21B 43/12; E21B 43/128; E21B 49/087; E21B 13/10;
(Continued)

(56) References Cited

U.S. PATENT DOCUMENTS 4,019,373 A    4/1977   Freeman et al.
6,587,037 B1   7/2003   Besser et al.
(Continued)

FOREIGN PATENT DOCUMENTS

WO     2008104750 A1    9/2008

OTHER PUBLICATIONS

PCT/US2014/065372, International Search Report and Written Opinion, dated Mar. 27, 2015, 15 pgs.
(Continued)

*Primary Examiner* — Robert E Fuller
*Assistant Examiner* — Neel Girish Patel
(74) *Attorney, Agent, or Firm* — Foley & Lardner LLP (57) ABSTRACT

A technique facilitates testing and monitoring of a well. An artificial lift system is operated to produce a well fluid, and data is collected as the artificial lift system is operated at different flow rates. The data collected at the different, e.g. varying, flow rates is used in estimating flow performance and to enable continued monitoring of the well. In some applications, the data may be obtained by utilizing a virtual flow metering technique.

20 Claims, 11 Drawing Sheets

Related U.S. Application Data filed on Nov. 13, 2013, provisional application No. 61/903,945, filed on Nov. 13, 2013.

(51) Int. Cl.
*E21B 43/12* (2006.01)
*F04D 13/10* (2006.01)
*E21B 49/08* (2006.01)
*G05B 19/416* (2006.01)
*E21B 47/06* (2012.01)

(52) U.S. Cl.
CPC ............ *E21B 49/087* (2013.01); *F04D 13/10* (2013.01); *F04D 15/0066* (2013.01); *G05B 19/416* (2013.01); *E21B 47/06* (2013.01)

(58) Field of Classification Search
CPC .... E21B 15/0066; E21B 47/06; E21B 47/065; G01F 1/34; G05B 2219/3371
See application file for complete search history.

(56) References Cited

U.S. PATENT DOCUMENTS

| | | | |
|---|---|---|---|
| 8,527,219 | B2 | 9/2013 | Camilleri |
| 2005/0173114 | A1 | 8/2005 | Cudmore et al. |
| 2005/0217350 | A1* | 10/2005 | Jabusch ................ E21B 47/008 73/64.55 |
| 2008/0067116 | A1 | 3/2008 | Anderson et al. |
| 2008/0257544 | A1* | 10/2008 | Thigpen .................. E21B 43/14 166/250.01 |
| 2008/0262737 | A1 | 10/2008 | Thigpen et al. |
| 2009/0044938 | A1 | 2/2009 | Crossley et al. |
| 2011/0088484 | A1* | 4/2011 | Camilleri ................. G01F 1/34 73/861.42 |
| 2011/0098931 | A1* | 4/2011 | Kosmala ................ E21B 47/00 702/12 |
| 2011/0301851 | A1* | 12/2011 | Briers ..................... E21B 43/16 702/12 |
| 2012/0153883 | A1 | 6/2012 | Hammel et al. |
| 2013/0038123 | A1 | 2/2013 | Wilkins et al. |
| 2013/0090853 | A1 | 4/2013 | Anderson |
| 2013/0206396 | A1* | 8/2013 | Hay ........................ E21B 23/10 166/248 |
| 2013/0272898 | A1 | 10/2013 | Toh et al. |
| 2014/0121973 | A1 | 5/2014 | Buchanan et al. |

OTHER PUBLICATIONS

Spath, et al, "Pressure Transient Technique Adds Value to ESP Monitoring", Asia Pacific Oil & Gas Conference and Exhibition, Jakarta, Indonesia, Apr. 20-22, 1999, SPE International, 7 pgs (SPE 54306).

Teixeira, V.F., et al., "Transient Modeling of a Subsea Pumping Module Using an ESP", SPE Latin American and Caribbean Petroleum Engineering Conference, Mexico City, MX, Apr. 16-18, 2012, SPE International, 12 pgs (SPE 153140).

CA Office Action other than Search Report on CA Appl. Ser. No. 2927234 dated Mar. 1, 2021 (6 pages).

Camilleri, et al., "First Installation of Five ESPs Offshore Romania—A Case Study and Lesson Learned," SPE127593, Intelligent Energy Conference and Exhibition held in Utrecht, The Netherlands, Mar. 23-25, 2010.

SA Office Action on SA Appl. Ser. No. 516371107 dated Oct. 31, 2021 (15 pages).

SA Office Action on SA Appl. Ser. No. 516371107 dated Jan. 31, 2022 (10 pages).

CA Examination Report on CA Appl. Ser. No. 2927234 dated Aug. 12, 2021 (5 pages).

\* cited by examiner

WELL TESTING AND MONITORING

CROSS-REFERENCE TO RELATED APPLICATIONS

The present document is based on and claims priority to U.S. Provisional Application Ser. No. 61/903,945 filed Nov. 13, 2013; U.S. Provisional Application Ser. No. 61/903,947 filed Nov. 13, 2013; and U.S. Provisional Application Ser. No. 61/903,952 filed Nov. 13, 2013, which are incorporated herein by reference in their entirety.

BACKGROUND

Various well installations may be equipped with control and monitoring equipment. For example, electric submersible pump (ESP) installations may be equipped with devices for monitoring flow, pressure, temperature, or other operational parameters. The devices may comprise a variety of gauges and sensors deployed downhole with the electric submersible pump to detect and monitor the desired parameters. However, existing devices and techniques can be difficult to use and may not be cost-efficient when monitoring certain parameters. Additionally, some existing techniques utilize stopping of the well to obtain measurements at different operational stages of the well, but such stoppage can substantially reduce the efficiency of a variety of well operations.

SUMMARY

In general, a system and methodology are provided for testing and monitoring a well. An artificial lift system is operated to produce a well fluid, and data is collected as the artificial lift system is operated at different flow rates. The data collected at the different, e.g. varying, flow rates is used in estimating flow performance and to enable continued monitoring of the well. In some applications, the data may be obtained by utilizing a virtual flow metering technique.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology which facilitate testing and monitoring of a well. An artificial lift system is operated to produce a well fluid, and data is collected as the artificial lift system is operated at different flow rates. The data collected at the different, e.g. varying, flow rates is used in estimating flow performance and to enable continued monitoring of the well. In some applications, the data may be obtained by utilizing a virtual flow metering technique which enables certain types of testing without stopping the flow of fluid in the well for measurements.

In various well applications, it may be desirable to obtain performance characteristics of a deployed artificial lift system, e.g. an electric submersible pumping system, and of the sub-surface oil reservoir as a measure of the reservoir's future production potential. The performance characteristics of both the electric submersible pumping system and the reservoir often vary over time. By way of example, various sensors and closed loop control systems may be used with electric submersible pumping systems and other well systems to provide improved testing and monitoring of the pumping system and the reservoir. The systems and devices for testing and monitoring may comprise a variety of gauges and sensors deployed, for example, on the surface and at downhole locations with the electric submersible pumping system to detect and monitor desired parameters, such as reservoir performance parameters. In some applications, monitoring and corresponding adjustments to operation of the electric submersible pumping system may be performed automatically. This provides a closed loop system for continued improvement with respect to operation of the electric sprinkle pumping system based on detected reservoir performance parameters and other operational parameters.

According to an embodiment, an automated system and methodology for electric submersible pumping system testing and reservoir testing are provided. The system and methodology may be employed to provide improved characterization of pump and reservoir performance by automatically varying operating parameters, e.g. motor variable speed drive (VSD) frequency, pressure choke values, pressure differences, and/or flow or motor drive currents, while operating the pumping system under these varied operating parameters. Additionally, the automated testing can be performed over a prolonged period of time.

In general, embodiments described herein relate to various aspects of well and reservoir testing and performance and may include automatically capturing buildup data with specific protocols which are triggered each time a pumping system is turned off. Some embodiments have equipment able to capture the pressure build up even if surface power is lost. For example, a pump shutdown may be triggered by loss of surface power and this can also cause loss of sensor or gauge data transmission. Embodiments described herein further facilitate automating data capture and analysis processes to enable reservoir performance monitoring over time. Additionally, certain embodiments may be used for reservoir performance determination and/or determination of optimum operating conditions based on automated detection of changing well conditions.

As described in greater detail below, the equipment and processes enable the well testing to be performed automatically. During well start up, tests may be performed to facilitate monitoring of the well and the pumping system employed in the well. For example, the variable speed drive frequency may be adjusted, choke position may be adjusted, and/or specific ramp up profiles related to an electric submersible pumping system may be used to facilitate accumulation of test data during start up. The start up data and data from continued operation of the pumping system are then automatically analyzed and the results are stored over time to facilitate reservoir/well monitoring. Notifications and/or recommendations may be provided when certain well parameters, e.g. reservoir pressure or productivity index data, drop or otherwise move past a predetermined threshold.

In specific applications, embodiments enable systematic analysis of planned or unplanned pressure/flow rate changes to determine reservoir performance indicators such as reservoir pressure, skin, or other reservoir performance indicators. Additionally, the automated well testing enables testing of the well without stopping the pumping system, thus minimizing production losses. The data collected also may be used to provide recommendations on optimum pump operating points as the reservoir performance varies over time. The data further facilitates the automated design or selection of pumps for future installations based on actual and/or forecast reservoir performance.

Figure 1:
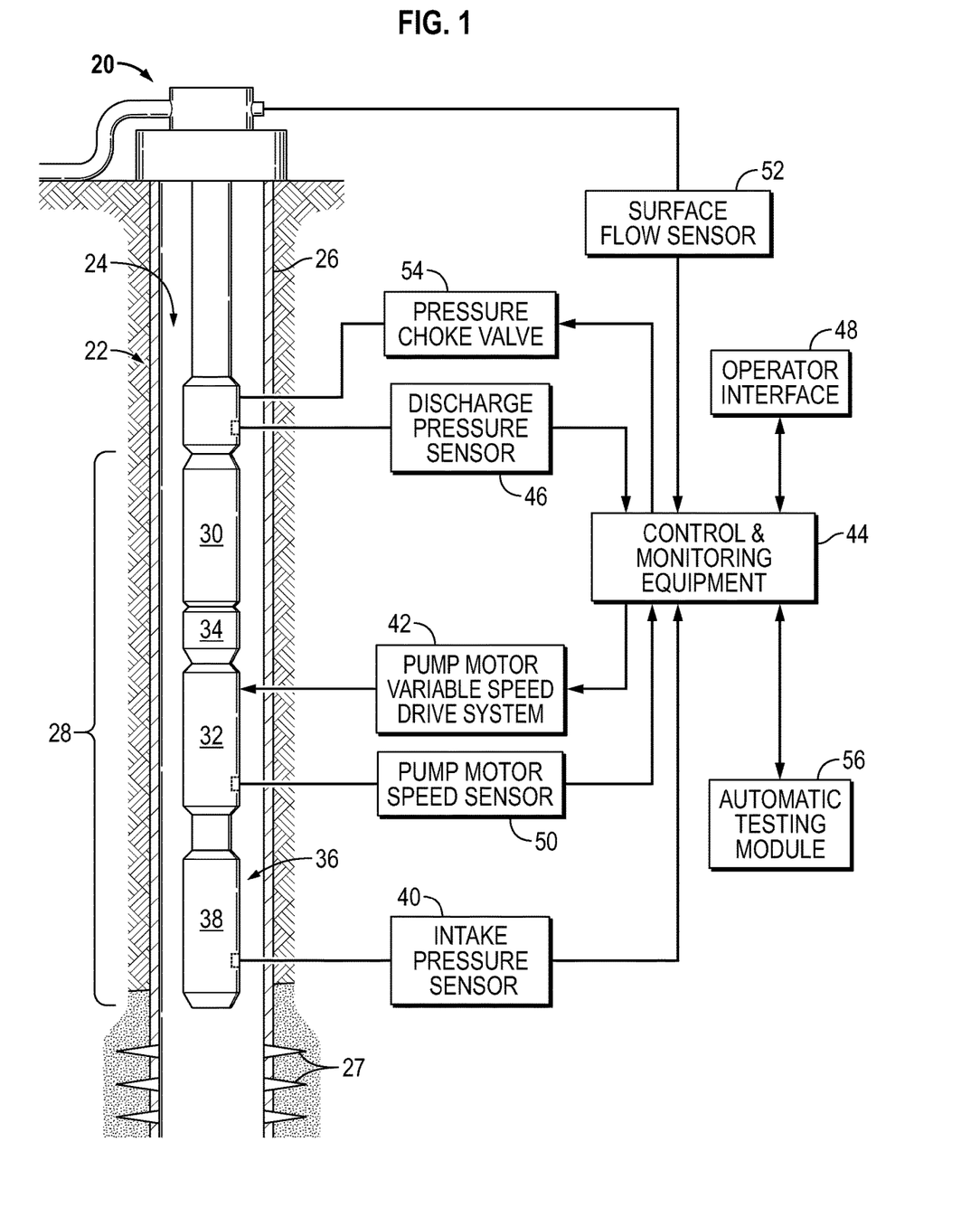
FIG. 1 is an illustration of an example of a well system that may be used for well and reservoir testing and monitoring, according to an embodiment of the disclosure.

Referring generally to FIG. 1, an example of a well system 20 is illustrated as comprising a completion 22 deployed in a wellbore 24 which may be lined with a casing 26 having perforations 27. In this example, the well system 20 comprises an artificial lift system 28 in the form of an electric submersible pumping system. The electric submersible pumping system 28 may have a variety of components including, for example, a submersible pump 30, a motor 32 to power the submersible pump 30, a motor protector 34, and a sensor system 36, such as a multisensory gauge 38.

By way of example, the multisensory gauge 38 may be in the form of or comprise elements of the Phoenix Multisensor xt150 Digital Downhole Monitoring System™ for electric submersible pumps and manufactured by Schlumberger Technology Corporation. The multisensory gauge 38 may comprise sensors for monitoring downhole parameters, such as temperature, flow, and pressure. For example, the multisensory gauge 38 may have an intake pressure sensor 40 for measuring an inlet pressure of the electric submersible pumping system 28. A power source, such as a surface power source may be used to provide electrical power to the downhole components, including power to the submersible motor 32 via a suitable power cable or other conductor.

In this example, the motor 32 may be controlled with a variable speed drive (VSD) system 42. An example of the VSD system 42 is described in U.S. Pat. No. 8,527,219. The VSD system 42 may be used to provide a variable frequency signal to motor 32 so as to increase or decrease the motor speed.

The well system 20 also may comprise control and monitoring equipment 44 which is placed in communication, e.g. electrical communication, with desired sensors, such as multisensory gauge 38 and a discharge pressure sensor 46. The control and monitoring equipment 44 also may incorporate a supervisory control and data acquisition (SCADA) system and is constructed to enable control of downhole components and monitoring of various downhole parameters. Examples of such downhole parameters include temperature, flow, and pressure. Examples of an SCADA system and other industrial control systems are described in US Patent Publication 2013/0090853. The control and monitoring equipment 44 also may comprise an operator interface 48 and may incorporate at least one processing unit. The at least one processing unit of equipment 44 can be operated for executing software application instructions, for storing and retrieving data from memory, and/or for rapidly and continuously processing input signals from intake pressure sensor 40, discharge pressure sensor 46, a pump motor speed sensor 50, a surface flow sensor 52, and/or other suitable sensors.

Additionally, control and monitoring equipment 44 may be used to output control signals to the pump motor VSD system 42 and/or to other components, such as a pressure choke valve 54. The signals from the various downhole sensors may be conveyed to control and monitoring equipment 44 via a downhole wireline or other suitable communication line. Output control signals may be generated according to control algorithms or applications executed by the control module 44 so as to perform automated procedures on the electric submersible pumping system 28. Examples of the automated procedures include control of the motor 32 and automated testing of the electric submersible pumping system 28 and/or of the overall well system 20.

According to an embodiment, an automatic testing module 56 may be incorporated into the control and monitoring equipment 44. Automatic testing module 56 is used to vary operating parameters, such as the drive frequency provided to pump motor VSD system 42 and/or the position of pressure choke valve 54. Automatic testing module 56 also may be used to log test data by storing values corresponding to sensed signals from surface flow sensor 52, discharge pressure sensor 46, pump motor speed sensor 50, and/or intake pressure sensor 40. By varying operational parameters, e.g. settings of the pressure choke via pressure choke valve 54, drive frequency to VSD system 42, and/or corresponding speed of pump motor 32, variations in operational controls/conditions, e.g. the pressure differential across pump 30, fluid flow, motor current, and/or other operational conditions, may be controlled and adjusted incrementally. The control and incremental adjustments are made during a test procedure and may be performed by the automatic testing module 56.

The automatic testing module 56 may comprise a microprocessor or other suitable processor to process signals from the various downhole sensors associated with the electric submersible pumping system 28 continuously and in real time. Control and monitoring equipment 44 may be used to provide closed loop control of various operating parameters associated with the electric submersible pumping system 28 during operation. By way of example, the closed loop control may include obtaining sensor readings for the sensed operating and environmental parameters. The information used in the closed loop control processes also may be utilized by the automatic testing module 56 to determine operational parameters to be logged as test data.

Figure 2:
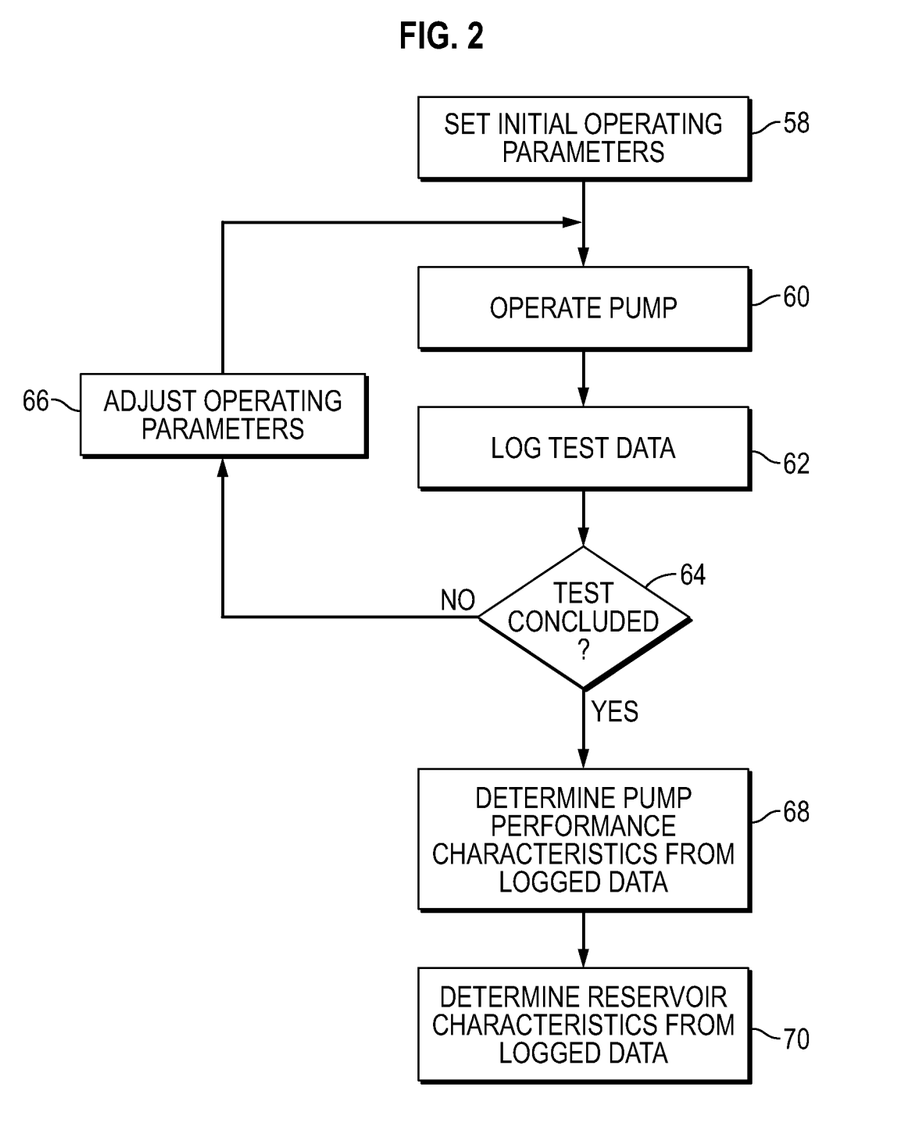
FIG. 2 is a flowchart illustrating an operational example employing the well system illustrated in FIG. 1, according to an embodiment of the disclosure.

Referring generally to FIG. 2, a flowchart is used to illustrate an operational example of automatic well and reservoir testing. In this example, initial operating parameters are set by the automatic testing module 56, as represented by block 58. Additionally, the pump 30 and the overall well system 20 are operated, as represented by block 60, and test data is logged, as represented by block 62. The automatic testing module 56 may be employed to process the data and to make a decision as to whether a test is concluded, as represented by block 64. If the test is not concluded, one or more operational parameters are further adjusted, as represented by block 66 and then the process described with respect to blocks 60, 62 and 64 is repeated for each incremental adjustment of the operational parameters. If the test is concluded, the automatic testing module 56 processes the logged test data to determine pump performance characteristics, as represented by block 68. The automatic testing module 56 also may be employed to process the logged test data to determine reservoir characteristics, as represented by block 70.

The testing procedures may be repeated over time to indicate or predict performance related changes. For example, the testing procedures may be repeated to indicate or predict deterioration of the pump 30, to quantify the remaining useful life of the pump 30, to determine an estimated expected future production from the reservoir, and/or to indicate or predict other performance related changes. The well system and the operational parameters may be monitored over time as desired for a given well system application.

In some applications, the testing and monitoring procedures may be used to find an optimum operating level for pump 30 and the overall electric submersible pumping system 28. For example, at system startup, the automatic testing module 56 may be used to automatically adjust the setting of choke valve 54 to several different incremental positions and to further obtain sensor measurements and log test data for each incremental position. The logged test data can then be used to find the optimum operating speed of pump 30. In some applications, this process is performed automatically in a manner which is transparent to a well operator. The startup optimization process may be repeated each time the pump is operated or according to other desired schedules. Additionally, the test data may be logged for each startup cycle to obtain an operating history for the pump 30, and then the operating history may be analyzed to determine a predicted useful life or failure. The automatic testing enables reduction or elimination of the time and cost associated with manually conducted well and reservoir testing procedures.

Figure 3:
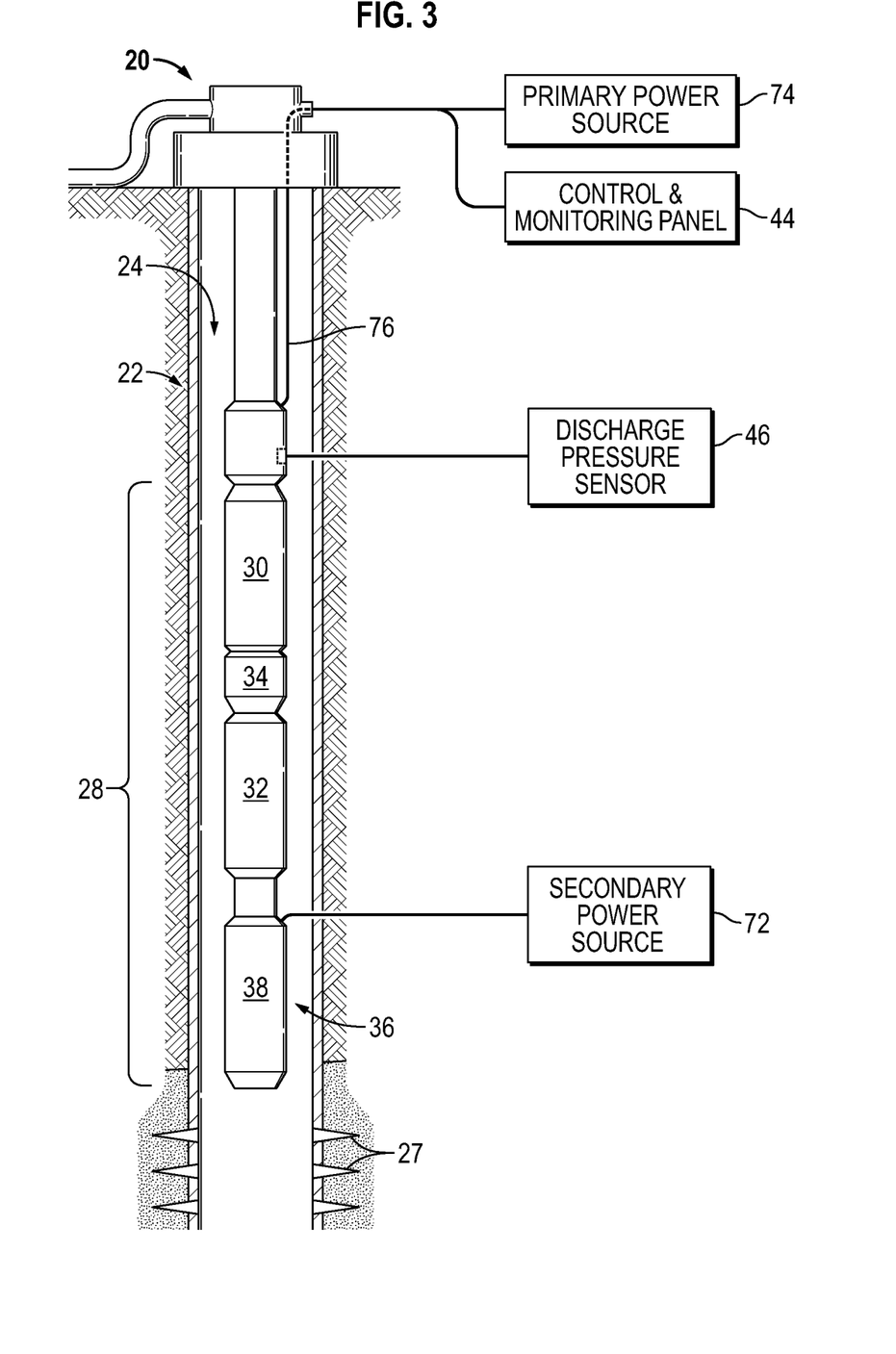
FIG. 3 is another illustration of an example of a well system that may be used for well and reservoir testing and monitoring, according to an embodiment of the disclosure.

Referring generally to FIG. 3, another example of a well system 20 is illustrated. In this example, the well system 20 is used for measuring downhole parameters, e.g. pressure build, related to operation of electric submersible pumping system 28 or another type of artificial lift system. In this embodiment, a reservoir size may be characterized by obtaining data on the pressure build. For example, continuous pressure build measurements may be performed using the multisensory gauge 38 which, in this embodiment, is powered by a secondary power source 72.

According to an application of the present methodology, continuous pressure build measurements are obtained using the multisensory gauge 38 when the submersible motor 32 is in a non-powered state. This enables performance of pressure measurements that are not influenced by mechanical and electrical noise that may otherwise be present when the electric submersible pumping system 28 is powered. The secondary power source 72 may be located downhole or at a surface location, depending on the parameters of a given well application, to enable operation of the multisensory gauge 38 regardless of whether power is supplied to the electric submersible pumping system 28.

As described above, multisensory gauge 38 may comprise a variety of sensors for monitoring desired downhole parameters, such as temperature, flow, and/or pressure. Additionally, the multisensory gauge 38 may include a sensor for measuring an inlet pressure of fluid drawn into electric submersible pumping system 28. Although illustrated as a discrete component, the multisensory gauge 38 may be integrated into other components, such as pump 30.

In this example, a primary power source 74 may be used to provide power to downhole components, including power to motor 32, via a suitable power cable 76 or other power communication line. In this system, the control and monitoring equipment 44 is coupled in electrical communication with multisensory gauge 38 and outlet pressure sensor 46 via cable 76 or via another suitable communication line. The secondary power source 72 provides power to the multisensory gauge 38 independently of the power supplied to motor 32 from primary power source 74. By way of example, the secondary power source 72 may comprise a downhole battery, surface battery, and/or other suitable secondary power source. In some applications, the secondary parser 72 may be a rechargeable power source coupled to a motor phase cable and charged while the pump motor 24 receives power from the primary power source 74.

Figure 4:
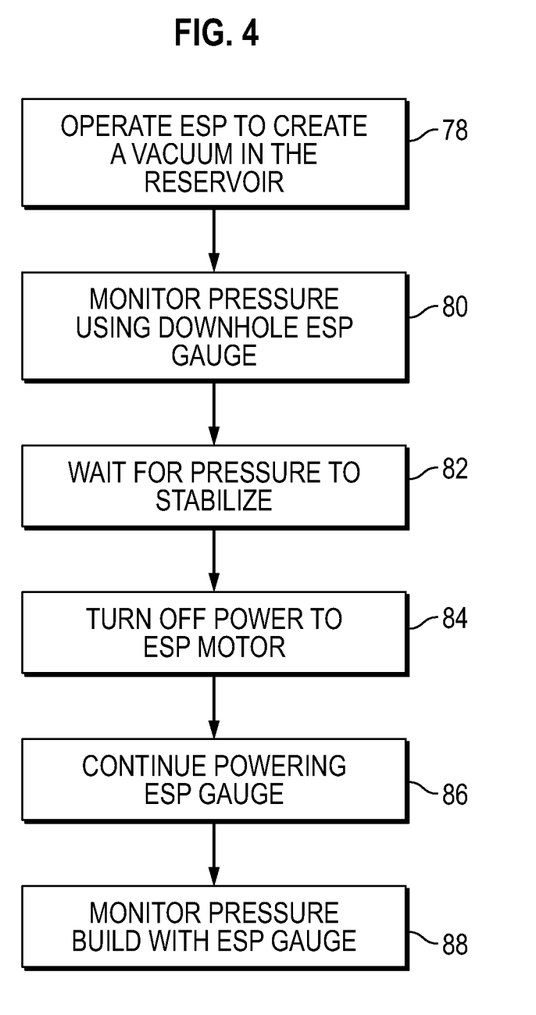
FIG. 4 is a flowchart illustrating an operational example employing the well system illustrated in FIG. 3, according to an embodiment of the disclosure.

Referring generally to FIG. 4, a flowchart is used to illustrate an operational example of a testing application using pressure build measurements. In this example, the electric submersible pumping system 28 is operated to create a vacuum in the reservoir as represented by block 78. The downhole multisensory gauge 38 is employed to monitor pressure at the inlet of the electric submersible pumping system 28, as represented by block 80. When pressure readings have stabilized, as represented by block 82, the power to the submersible motor 32 is turned off, as represented by block 84. At this stage, power to the multisensory gauge 38 continues and is supplied from the secondary power source 72, as represented by block 86. The pump inlet pressure is monitored continuously with the multisensory gauge 38, as represented by block 88. Pressure build is thus measured by the inlet pressure gauge (e.g. intake pressure sensor 40) of multisensory gauge 38 while the submersible motor 32 and pump 30 are powered off, i.e. not operating. This testing approach provides more accurate pressure build measurements that are free from the electrical and mechanical noise created by operation of the pumps 30 and motor 32.

Use of the pressure build testing provides a more efficient and lower cost methodology for reservoir characterization because various components and equipment are eliminated. For example, the additional gauges, additional monitoring equipment, separate pressure build measurement and testing systems, and other equipment associated with conventional testing procedures are not employed in the pressure build testing technique. Additionally, the methodology reduces the number of separate downhole assemblies that are deployed and run-in-hole to obtain pressure buildup readings and/or other sensor readings, thus decreasing the time associated with testing.

Depending on the application, a variety of actual sensors or virtual sensors, e.g. virtual flow meters, may be used for testing selected parameters to monitor the artificial lift system and/or the reservoir. Additionally, the sensing techniques may be used with a variety of artificial lift systems. For example, electric submersible pumping systems 28 are used in many types of oil wells to provide artificial lift for producing oil from the well. Pump surveillance, including monitoring, diagnosis, and control, is valuable for maximizing the runtime of the pumping system and/or maximizing performance of the well. As described above, various sensors may be used for sampling pressures, temperatures, vibrations, currents, flow, voltage, and/or other parameters to enhance the testing and monitoring of a given well.

Transient analysis of a well can be difficult during a production phase of the well because the production performance of the well tends to be better known as the life of the well has developed. Additionally, transient analysis often involves shutting down the well for measurements and this can result in deferred production, pump stress, or difficulty in restarting the well production. Obtaining precise flow rate values for trenchant analysis also can be difficult and costly. According to certain embodiments described herein, an improved technique for analysis of transient events is provided and helps determine various reservoir characteristics, such as pressure boundaries, permeability, and/or skin effect. These and other reservoir or well system characteristics may be determined and monitored for a variety of wells including new wells.

According to embodiments described herein, virtual flow meters may be used for determining rate difference measurements which, in turn, may be used for well performance estimation and monitoring. In some applications, the virtual flow meters may be calibrated against actual surface flow measurements. The virtual flow meters enable a high level of repeatability and an ease-of-use relative to physical flow meters. It should be noted that virtual flow meters may utilize a variety of techniques, including neural network techniques, nodal analysis, and/or head conversion techniques using pump curves. These and other virtual flow meter techniques may be combined with electric submersible pumping system 28 to simplify the well performance estimation and monitoring.

Virtual flowmeters in combination with electric submersible pumping system 28 can be used to measure downhole flow rate differences which can then be used to deliver information about petroleum reservoirs. For example, the virtual flow meters may be used for well performance estimation and monitoring through a multi-rate test. The pump 30 of electric submersible pumping system 28 may be actively controlled through predefined sequences of operation to perform multi-rate tests periodically and automatically. The multi-rate tests enable monitoring of the well and reservoir performance parameters, including monitoring the productivity index, reservoir pressure, reservoir skin, and/or other performance parameters, via analysis of the trending of these periodic tests.

In an embodiment, flow rate variations are generated following steady production from electric submersible pumping system 28. Resulting pressure variations are then analyzed together with flow rate data, e.g. computed flow rate data resulting from a virtual flow meter or from an actual physical flow meter. The initial variation of the rates may be achieved by, for example, changing the frequency of the pump motor variable speed drive 42 or changing wellhead pressure with choke adjustments, e.g. adjustments of pressure choke valve 54. In another example, the flow rate may be varied by adjusting a sliding sleeve or other device in the well completion 22. In many applications, the states deriving from these variations are maintained long enough to reach steady flow rate periods. Measured variations may be compared to known steady well flow rate periods, and transients between two stable states also can be analyzed.

The downhole flow rate of the electric submersible pumping system 28 may be calculated by a virtual flow metering technique and/or with a physical flow meter. Examples of virtual flow metering techniques comprise the use of head or delta pressure techniques, nodal analysis techniques, neural network techniques, power equation techniques which utilize a restriction of a global energy balance, and various combinations of such techniques. By way of specific examples, the flow rates may be derived from surface choke curves, effectively a subset of nodal analysis.

The calculated flow rate and measured pressure (both potentially corrected for depth) are then analyzed. By way of example, the analysis may comprise steady-state analysis in which the different steady states are analyzed via a multi-rate test or in which the different end values from an isochronal test are analyzed to determine a well inflow performance relationship (IPR). The analysis also may comprise a transient analysis, e.g. a rate transient analysis (RTA) or a pressure transient analysis (PTA). Subsequently, the differences in flow rate determination may be analyzed to evaluate an overall health of the well.

Figure 5:
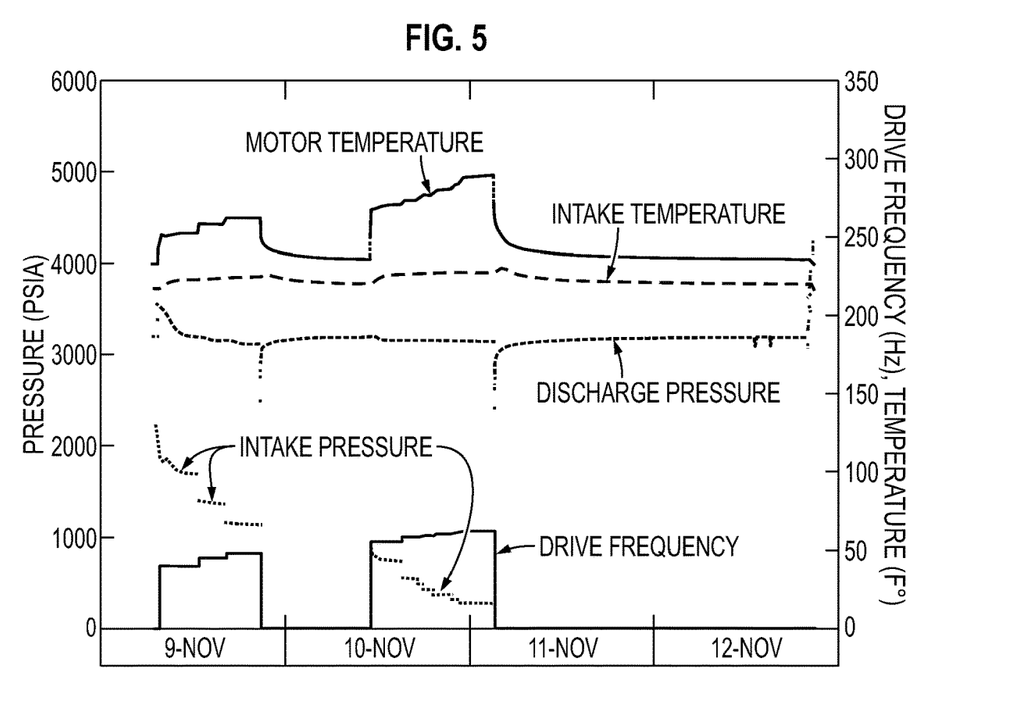
FIG. 5 is a graphical illustration of a dataset demonstrating several flow rate stages in which each flow rate stage reaches a steady pressure stabilization, according to an embodiment of the disclosure.
Figure 6:
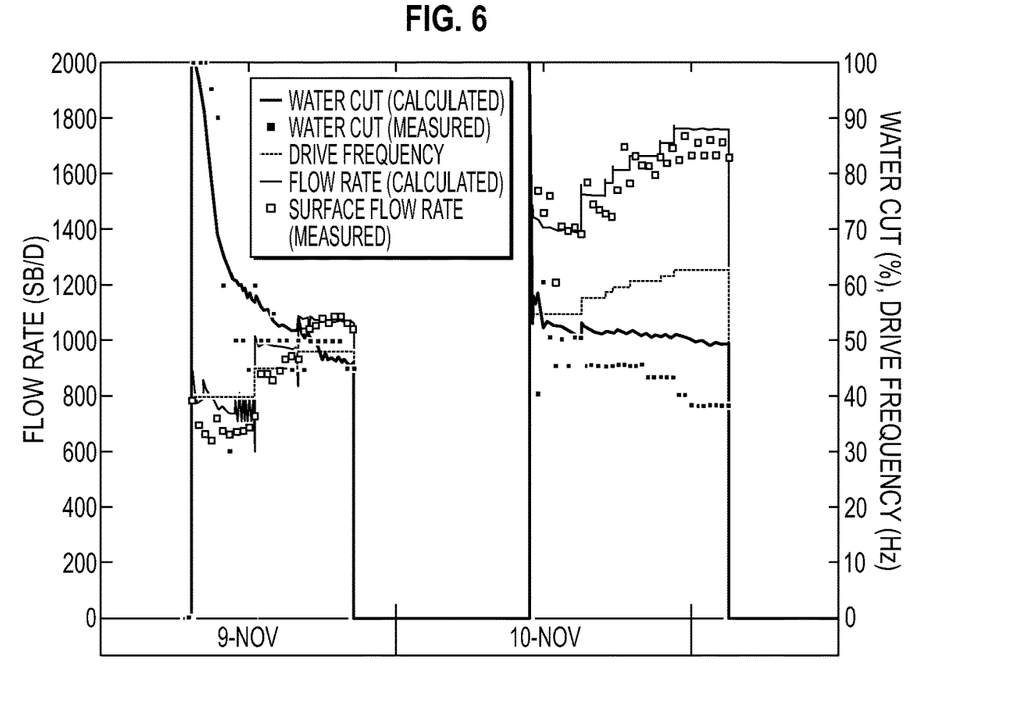
FIG. 6 is a graphical illustration showing calculation of an electric submersible pumping system flow rate using a head method, according to an embodiment of the disclosure.

According to an operational example, an electric submersible pumping system well test is performed using the general workflow described above. Referring initially to the graph of FIG. 5, a test was conducted by allowing steady pressure stabilization at several flow rate stages. The flow rate was then calculated using the head method referenced above and then calibrated against the well test. The results are illustrated in FIG. 6. In this example, Q(@60 Hz) was read on the head curve of the electric submersible pumping system from a calculated Head(@60 Hz) to determine $Q_{Pump}$, which may then be converted to a surface condition with appropriate pressure-volume-temperature (PVT) if desired. The appropriate calculations may be made according to the following formulas:

$$\text{Head}(@60\text{ Hz}) = (60/\omega)^2((P_d - P_i)/G_{AVG})$$

$$Q_{Pump} = Q(@60\text{ Hz})(\omega/60)$$

where:
$P_i$ and $P_d$ are intake pressure and discharge pressure, respectively;
$\omega$ is the drive frequency; and
$G_{AVG}$ is the average gradient of the fluid going through pump 30.

The results illustrated in FIG. 6 show that the calculated flow rate using the disclosed methodology is repeatable and capable of detecting different flow rate stages with very good resolution. The calculated flow rate using the disclosed virtual flow meter technique is more repeatable than determining flow rates with a test separator. However, actual flow rates may be used to obtain similar information.

Figure 7:
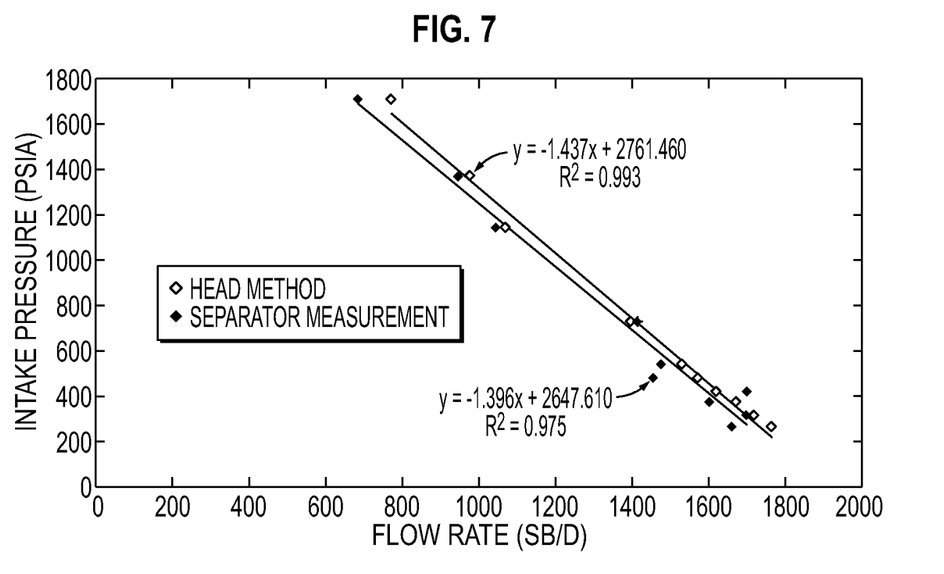
FIG. 7 is a graphical illustration demonstrating determination of a well inflow performance relationship, according to an embodiment of the disclosure.

Referring generally to the graph of FIG. 7, steady-state values are illustrated. Once flow rate and pressure are available, the IPR for the well may be determined by plotting stable intake pressure versus surface flow rate. In this example, the calculated flow rate is shown to yield almost perfectly aligned data points. Additionally, standard test separator measurements also may provide results, but those results are not as informational as the results obtained from the virtual flow metering technique. In many applications, the measurement of flow rate differences employing the virtual flow metering technique is very accurate, and substantial information can be gleaned based simply on changes in the flow rate differences.

Figure 8:
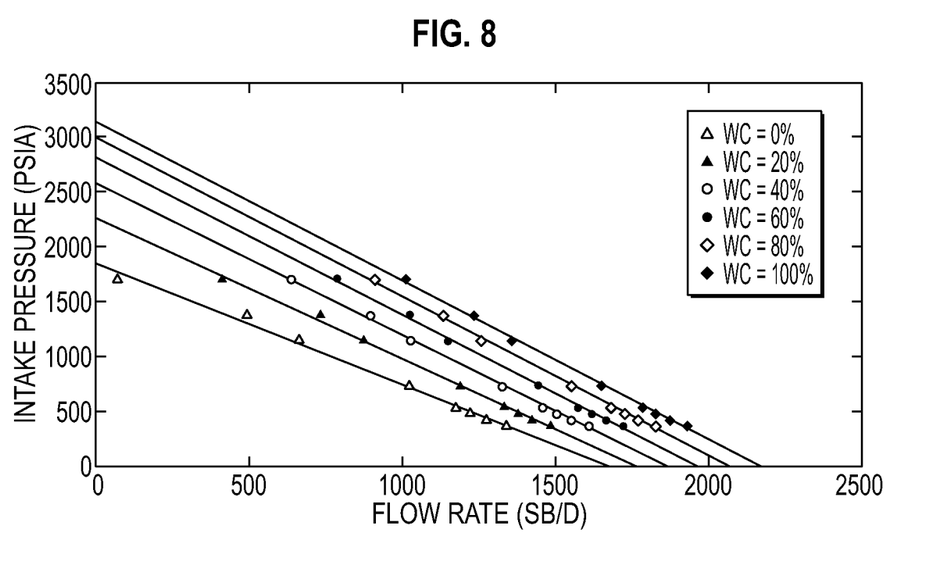
FIG. 8 is a graphical illustration showing a calculated inflow performance relationship sensitivity to water cut percentage, according to an embodiment of the disclosure.
Figure 9:
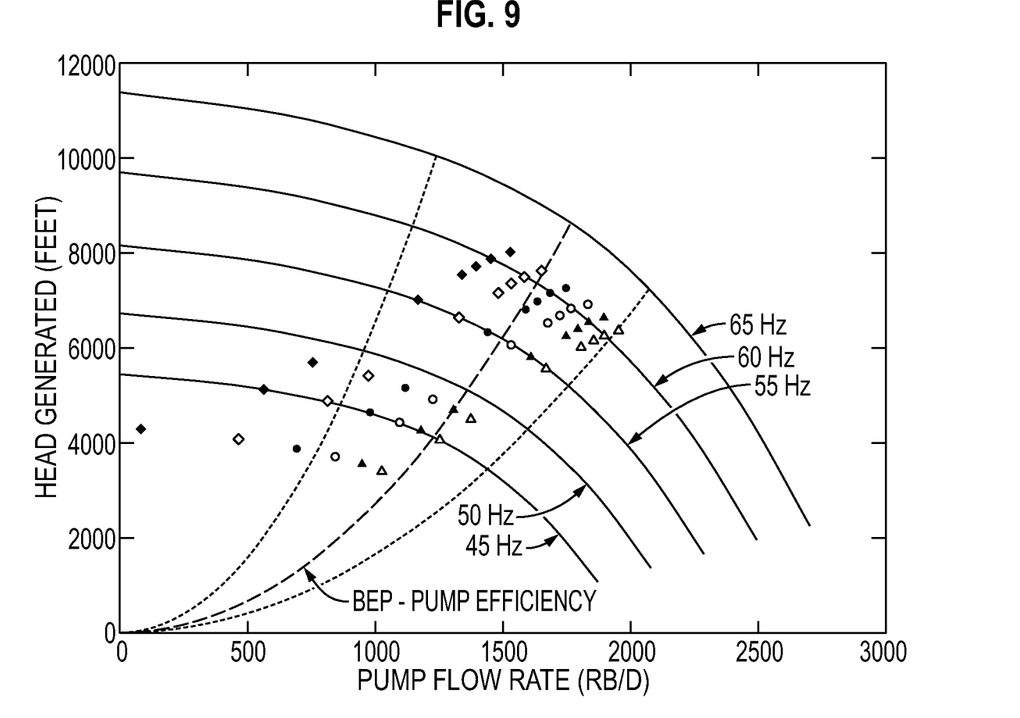
FIG. 9 is a graphical illustration demonstrating potential pump operation for different water cut percentages, according to an embodiment of the disclosure.

The repeatability of the calculations, even with uncertain water cut (WC) is illustrated by the graphs provided in FIGS. 8 and 9. It should be noted that water cut is directly related to $G_{AVG}$. The IPR for different percentages of WC in the graph of FIG. 8 may be summarized as follows:

| WC % | PI (stbpd/psi) | Pr (psia) |
| --- | --- | --- |
| 0 | 0.91 | 1844.5 |
| 20 | 0.79 | 2257.8 |
| 40 | 0.73 | 2577.2 |
| 60 | 0.70 | 2813.1 |
| 80 | 0.69 | 2992.4 |
| 100 | 0.70 | 3129.8 |

In this example, the productivity index (PI) range is relatively narrow throughout operation of the electric submersible pumping system and is determined fairly precisely around 0.7 stbpd/psi. The terminal pressure (Pr) has a wider range between 2600 and 3100 psia. Depending on the operation of pump 30, the range may be more precise with respect to reservoir pressure and less precise with respect to PI, making it inverse to the present example. However, the preciseness of the reservoir pressure and PI is not limiting because of the repeatability of the differential of flow rate calculations. Thus, even with a lack of gradient information the reservoir performance may be determined. The workflow procedure described above may be used during the production phase of a well and can provide substantial benefit. In many applications, the methodology may be performed on wells producing oil with electric submersible pumping systems without disrupting flow by stopping the pumping system. The graphical illustration in FIG. 9 shows how the methodology may be used with a multi-rate test to determine IPR without stopping the well and without mobilizing a surface testing unit. Virtual flow metering enables tests to be designed for retrieving the same information as with conventional physical sensors but without stopping the well for obtaining measurements of the difference between zero flow rate (build-up) and a preceding production. The virtual flow rate technique enables detection of a smaller variation with sufficient accuracy to provide useful information which, in turn, can be analyzed to determine or predict well/reservoir performance.

The virtual flow rate methodology also may be used for active control of the electric submersible pumping system 28 through a predefined sequence of operations in which multi-rate tests are performed periodically and automatically. The virtual flow metering technique facilitates scheduling of well test activities on demand. This approach is very useful for remote wells and for reducing the overall operational costs.

In certain embodiments, various predefined sequences of operations can be used. For example, different flow rate stages may be achieved, e.g. where the duration of each stage depends on the expected reservoir response. The flow rate may be controlled by, for example, varying choke settings or varying electric submersible pumping system drive frequency. During such testing procedures, the total daily production can be maintained at a constant target level or above a target level. In some applications, the test operations as well as a scheduling of the test operations may be automated.

Figure 10:
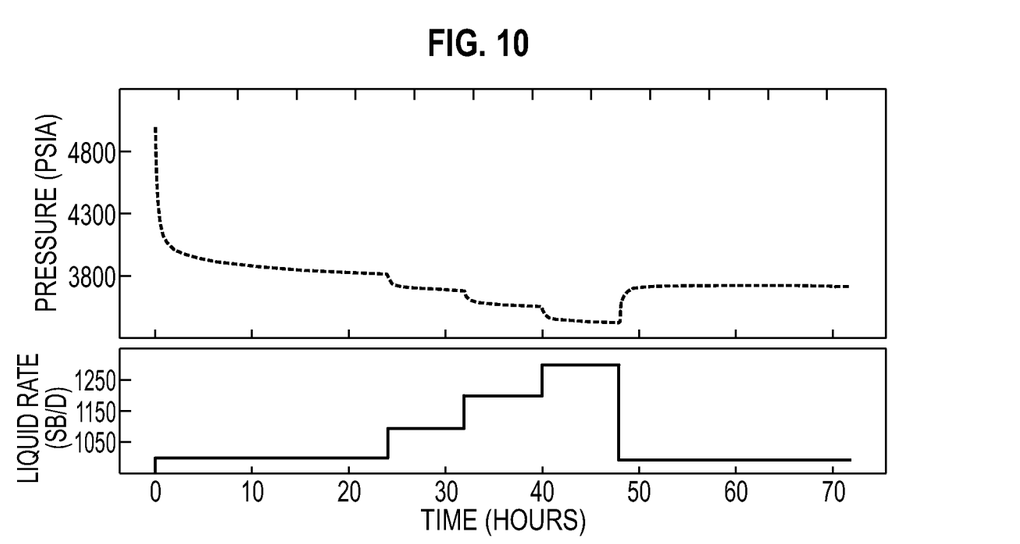
FIG. 10 is a graphical illustration showing use of a multi-rate test to determine inflow performance relationships without well stoppage, according to an embodiment of the disclosure.

According to two specific examples, operational sequences are conducted by varying the pump motor variable speed drive frequency, however choke variations may be used in some applications. According to a first example, the IPR is determined by (a) starting the operational sequence at a stable production period (in some applications, the stable production period may be at 50 Hz although other stable production periods may be used); (b) increasing the frequency of the pump motor variable speed drive by 2 Hz for three stages of eight hours each (although other frequency increases, numbers of stages, and time periods may be employed); and (c) going back to the original frequency. The results of this testing procedure are illustrated graphically in FIG. 10. The repeatability of the virtual flow metering enables the design of tests with less flow amplitude (no stops) while still providing at least the same level of information as with conventional testing. However, the actual flow rates also can be detected by actual sensors to determine the differentials.

Instead of starting from a stable production period, the methodology also can be performed systematically at, for example, a pump start-up where the frequency is ramped up to a target operational level. Thus, instead of going directly to the target frequency, a sequence increase can be designed to ensure a safe start of well production while deriving valuable reservoir information via data obtained from the virtual flow meter.

Figure 11:
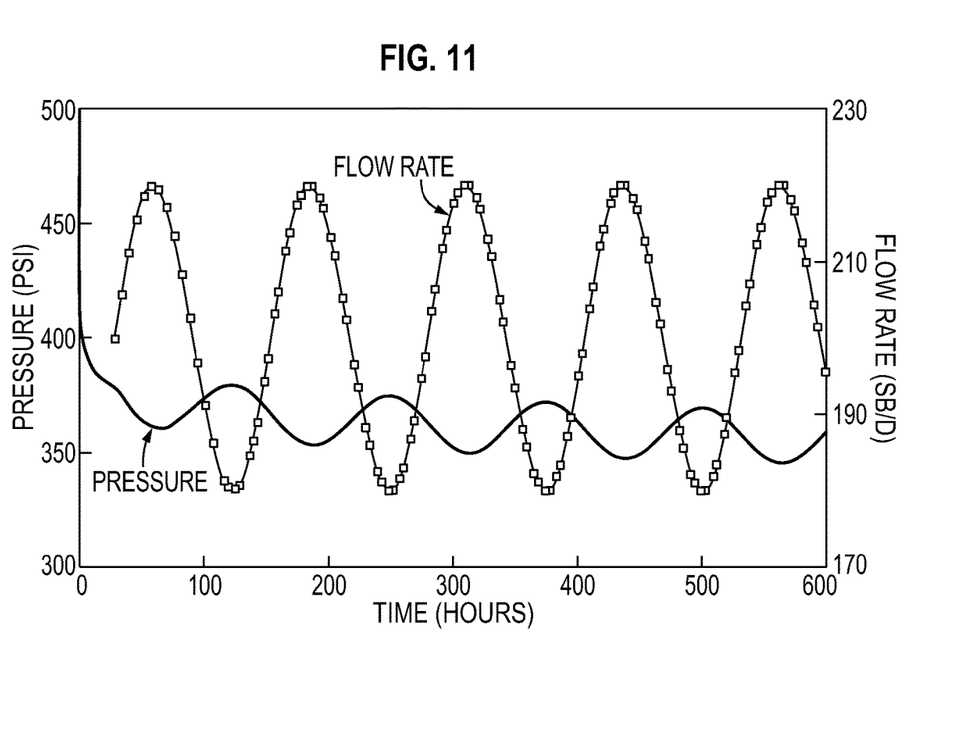
FIG. 11 is a graphical illustration showing a pressure and flow rate scenario involving analyzing a pressure response of a well to a sine wave flow rate variation using electric submersible pumping system monitoring, according to an embodiment of the disclosure.

In the second specific example, the pressure response of the well is measured based on a sign wave flow rate variation such as the pressure and flow rate scenario illustrated graphically in FIG. 11. It should be noted that even though the performance of variable speed drive systems have been improved, the generation of a sign wave flow rate can be challenging. However, a Fourier analysis suggests that a square wave is an infinite sum of sine waves as established by the following equation:

$$x_{square}(t) = \frac{4}{\pi} \sum_{k=1}^{\infty} \frac{\sin(2\pi(2k-1)ft)}{(2k-1)}$$

-continued $$= \frac{4}{\pi}\left(\sin(2\pi ft) + \frac{1}{3}\sin(6\pi ft) + \frac{1}{5}\sin(10\pi ft) + \ldots\right)$$

Thus, while a sign wave flow rate may be difficult to generate, a square wave flow rate is simple to create by alternating between two frequencies via the variable speed drive system. The resulting, generated square wave flow rate is illustrated graphically in FIG. 12.

Figure 12:
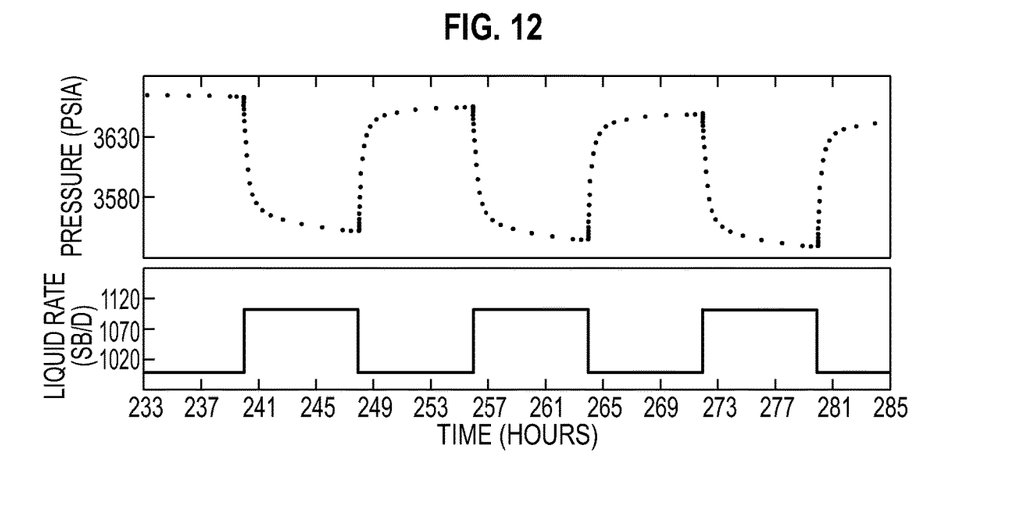
FIG. 12 is a graphical illustration showing an example of a pressure response for a square wave flow rate, according to an embodiment of the disclosure.

According to this embodiment, the testing procedure comprises: (a) starting pumping at a stable period of variable speed drive frequency, e.g. 50 Hz; and (b) alternating the frequency between two neighboring frequencies, e.g. 48/52 Hz, 50/52 Hz, or other suitable neighboring frequencies. The alternating frequencies are selected to create substantial flow and pressure variations and the alternating is performed for a desired number of iterations. Generally, the duration of the iterations may be selected according to the expected reservoir response. In a specific example, the iterations each last for six hours, although other lengths of time may be selected. Additionally, the same duration often is used for the iterations, although the duration could be varied in some applications. In this particular example, two values of frequencies are provided for simplicity of analysis. However, other combinations of frequencies with various durations and amplitudes may be employed.

The diffusion equation is linear and thus equations (9) and (10) from SPE 54306 can be adapted to provide:

$$\text{Skin} = \frac{\Delta P_A(\text{measured}) - \Delta P_A(\text{skin} = 0)}{0.87m}$$

where:

$$m = \frac{162.6\pi\mu B\Delta q}{4kh}$$

and it can be proven that:

$$\Delta P = m\text{Skin} + cte$$

where:

ΔP is the pressure variation amplitude visible on FIG. 12 and m can be calculated from the knowledge of Δq. Use of electric submersible pumping system virtual flow metering techniques allows for precise measurement of flow rate variation amplitude Δq.

Figure 13:
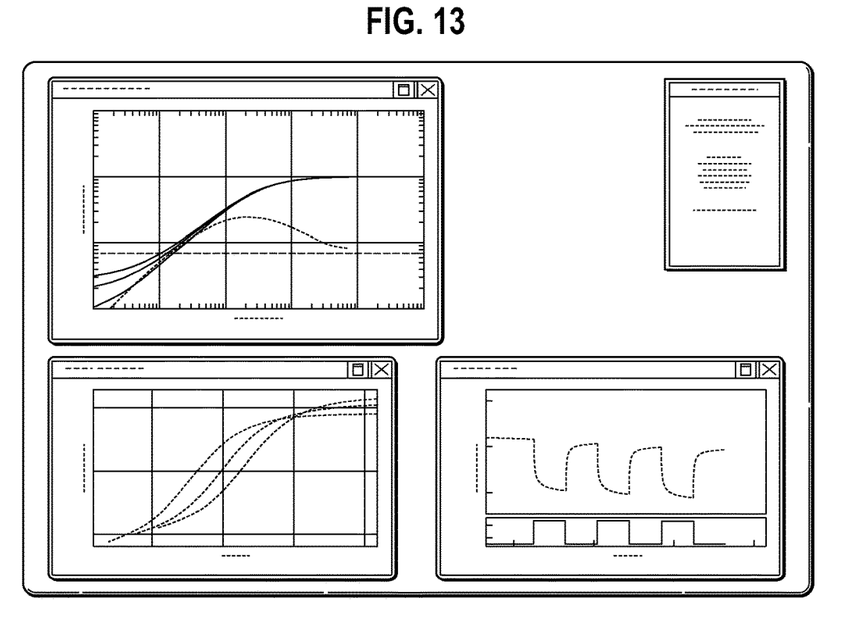
FIG. 13 is a graphical illustration analyzing "mini build ups" generated when a flow rate is decreased to enable well permeability and skin effect to be determined, according to an embodiment of the disclosure.

An example of a direct use of this methodology is in monitoring of well "skin effect" by regularly analyzing flow rate variations and the evolution of pressure variations. Additionally, the precise measurement of Δq enables traditional pressure transient analysis on the different "mini build up" periods from high flow rate values to low flow rate values, as illustrated in FIG. 13. Thus, permeability and the skin effect (and potentially boundary conditions) can be determined by flow rate variation amplitude measurement using the methodology described herein.

In another application, the methodology may be used for monitoring of well and reservoir performance using the trending of periodic tests. In this example, the procedure of starting at a stable period of variable speed drive frequency and then alternating the frequency between two neighboring frequencies can be performed automatically and periodically. This enables detection of trends regarding reservoir performance over time. In some applications, actual flow measurements may be used to provide at least some of the data.

Figure 14:
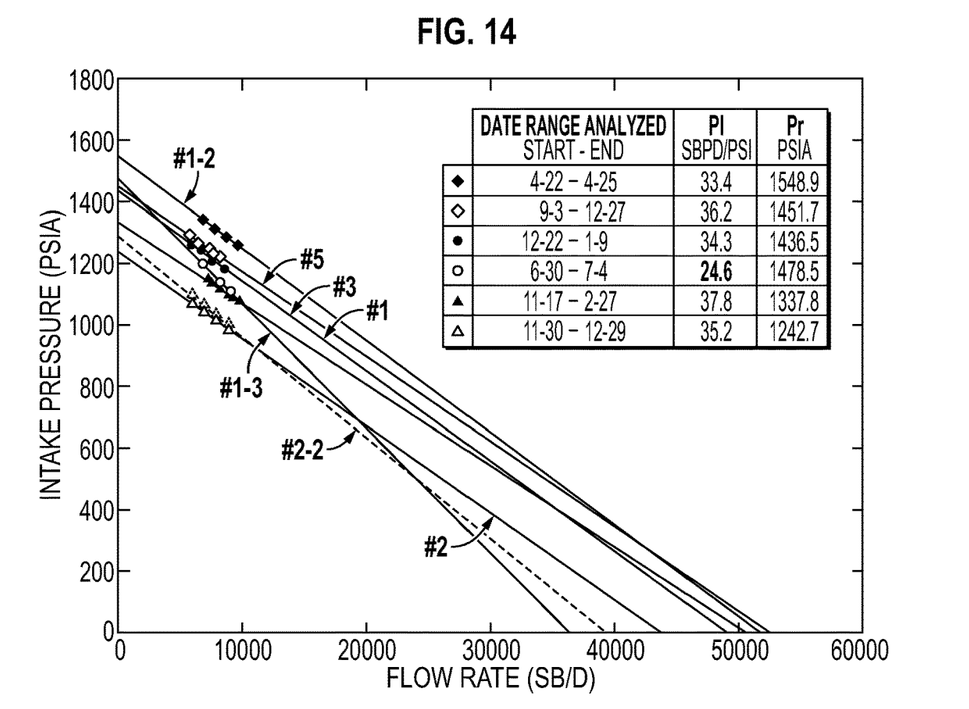
FIG. 14 is a graphical illustration showing well inflow performance over time, according to an embodiment of the disclosure.
Figure 15:
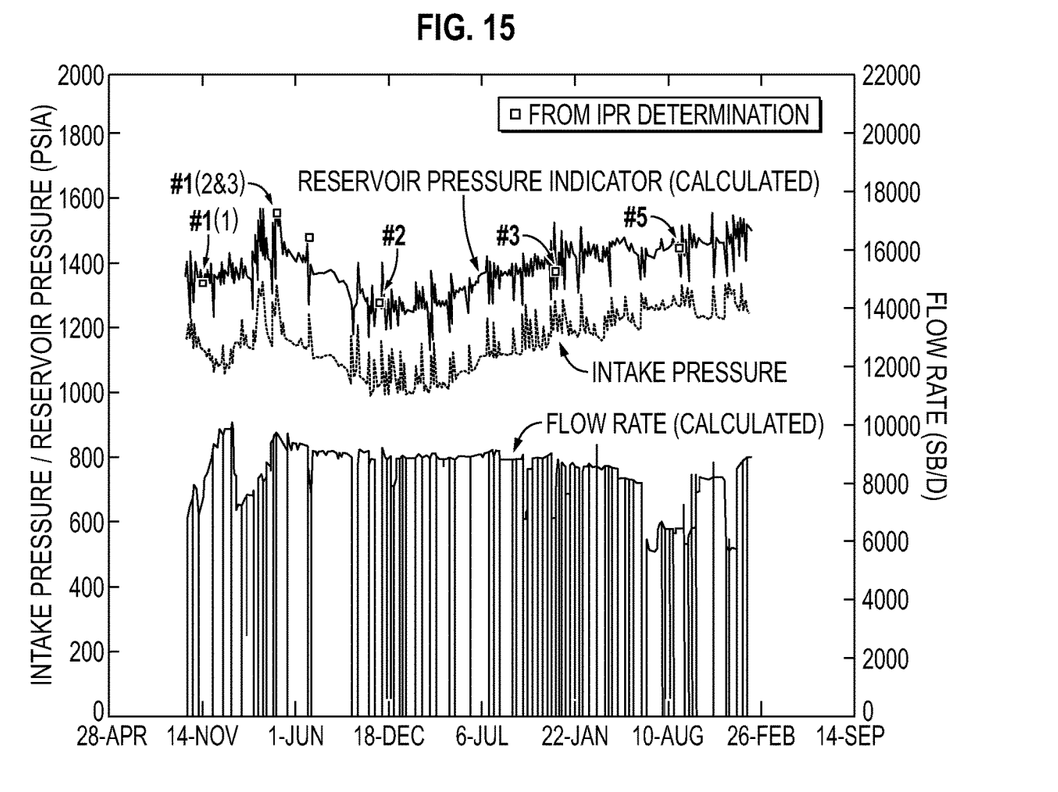
FIG. 15 is a graphical illustration showing an evolution of reservoir pressure with time, according to an embodiment of the disclosure.

Referring generally to FIGS. 14 and 15, the performance of a given well over a four-year period is illustrated. The well performance was demonstrated by analysis of the multi-rate events occurring during this period of time. In this particular example, the events were not scheduled to determine well performance but were instead run for a ramp start-up in which variable speed drive frequency was increased in a stepwise fashion.

In this particular example, several multi-rate events were found in six date ranges and were analyzed. As illustrated, the productivity index remained constant over time at about 36 stbpd/psi. Additionally, the evolution of reservoir pressure can be measured based on the continuous flow estimation from the virtual flow meter (or based on data from an actual flow meter). The ability to measure and analyze desired, trending performance indicators over time is valuable in enabling decisions and in providing production engineers and others with information that will allow them to improve the production performance from individual wells. The methodology also may be used to trend the well skin effect using the methods described herein and to evaluate deterioration. The virtual flow meter techniques enable cost-effective determinations at much shorter intervals as compared to conventional methodology.

In some embodiments, thresholds may be established for indicating when a change in differential of the related information reaches a certain percentage. By way of specific example, the well system may be set up so that an alarm sounds if the change in relative differential is at a predetermined percent, e.g. 5%. The particular threshold selected depends on the situation and can be set to provide warnings at different relative percentages.

Figure 16:
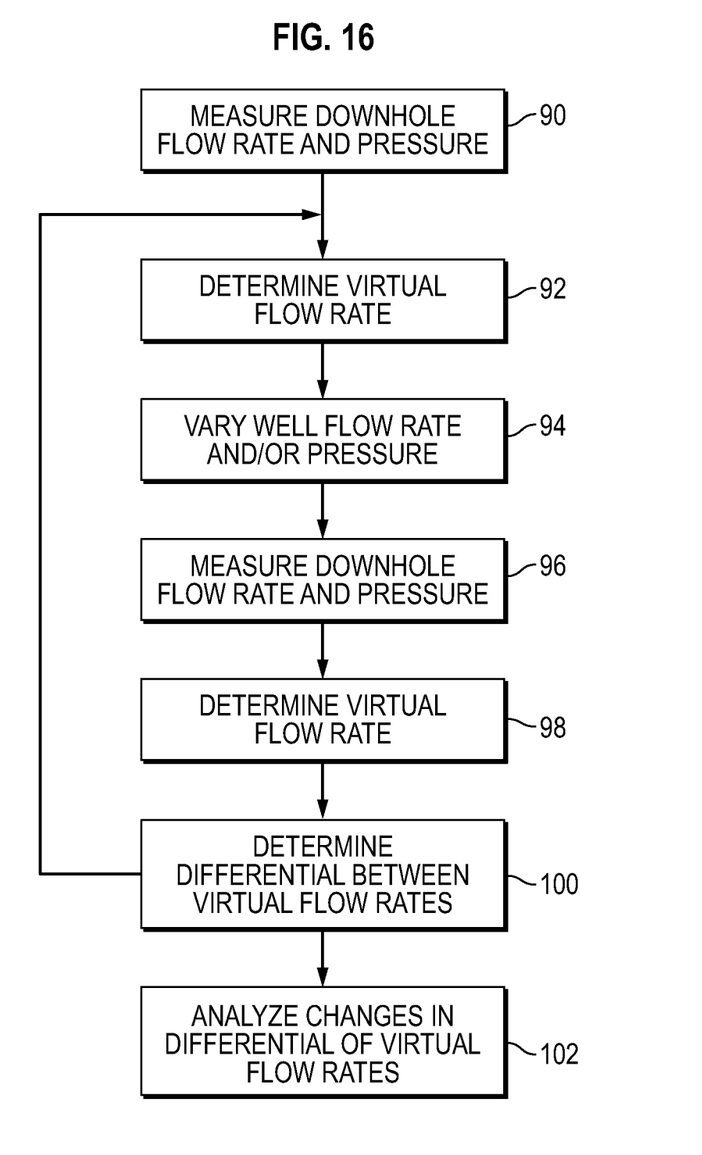
FIG. 16 is a flowchart providing an operational example of a well testing and monitoring technique, according to an embodiment of the disclosure.

Referring generally to FIG. 16, an example of the methodology carried out on well system 20 is illustrated. According to this embodiment, a downhole flow rate and pressure are measured, as represented by block 90. A virtual flow rate is then determined, as represented by block 92. The well flow rate and/or pressure is then varied, as represented by block 94. Following this variation, the downhole flow rate and pressure are again measured, as represented by block 96. The virtual flow rate is again determine, as indicated by block 98. This enables determination of the differential between virtual flow rates, as represented by block 100. This process may be repeated for a desired number of iterations. Following the desired iterations, the changes in differential of virtual flow rates may be analyzed to determine performance parameters/performance predictions related to the well system and/or reservoir, as represented by block 102.

Depending on the application, the well system 20 and artificial lift system 28 may have a variety of configurations and comprise numerous types of components. Additionally, various physical sensors and/or virtual sensors, e.g. virtual flow meters, may be employed. Additionally, the procedures for obtaining the actual data or virtual data may be adjusted according to the parameters of a given well, completion system, and/or reservoir. For example, various transient events may be introduced into the well to establish differentials which may be measured to obtain the desired data for well and/or reservoir analysis. Similarly, various types of algorithms, formulas, or other techniques may be employed for processing the data to monitor the well information and to make predictions regarding well and reservoir performance.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for monitoring a well, comprising:
    operating an electric submersible pumping system in a wellbore to produce a fluid from a well at a well flow rate;
    operating the electric submersible pumping system to vary the well flow rate to introduce a transient event into the well without stopping production of the well;
    calculating a flow rate of the electric submersible pumping system using a virtual flow metering technique and using data from before and after the transient event during production of the well, wherein the virtual flow metering technique comprises using one or more of a head or delta pressure technique, a nodal analysis technique, a neural network technique and a power equation technique that utilizes a restriction of a global energy balance;
    analyzing the calculated flow rate at different well flow rates to establish a differential in calculated flow rates;
    using the differential in the calculated flow rates to determine a performance parameter of the well; and
    automatically adjusting operating controls of the electric submersible pumping system in a closed loop manner during production of the well based at least in part on the determined performance parameter of the well.

2. The method as recited in claim 1, wherein operating comprises operating in a production mode.

3. The method as recited in claim 1, wherein calculating comprises correcting for depth.

4. The method as recited in claim 1, wherein analyzing the calculated flow rate comprises using steady-state analysis.

5. The method as recited in claim 1, wherein analyzing the calculated flow rate comprises using transient analysis.

6. The method as recited in claim 1, wherein calculating comprises using the virtual flow metering technique by analyzing head or delta pressure.

7. The method as recited in claim 1, wherein calculating comprises using the virtual flow metering technique by performing nodal analysis.

8. The method as recited in claim 1, wherein calculating comprises using the virtual flow metering technique by employing a neural network analysis.

9. The method as recited in claim 1, wherein calculating comprises using the virtual flow metering technique by employing a power equation analysis.

10. The method as recited in claim 1, further comprising determining an inflow performance relationship for the well by comparing an intake pressure versus a surface flow rate.

11. The method as recited in claim 10, further comprising determining a productivity index and an extrapolated reservoir pressure.

12. The method as recited in claim 1, wherein varying the well flow rate comprises varying the well flow rate without stopping the well.

13. The method as recited in claim 1, comprising calculating the flow rate of the electric submersible pumping system using a continuous virtual flow metering technique.

14. The method as recited in claim 1, comprising calculating the flow rate of the electric submersible pumping system using the virtual flow metering technique without stopping the well and without mobilizing a surface testing unit.

15. A method, comprising:
    calculating a downhole electric submersible pumping system flow rate or pressure relating to a fluid being pumped from a well by a downhole electric submersible pumping system;
    operating the downhole electric submersible pumping system to introduce a transient event into the well without stopping production of the well;
    calculating a differential in the downhole electric submersible pumping system flow rate or pressure from before and after the transient event during production of the well using a virtual flow rate technique, wherein the virtual flow rate technique comprises using one or more of a head or delta pressure technique, a nodal analysis technique, a neural network technique and a power equation technique that utilizes a restriction of a global energy balance;
    analyzing the differential in calculated flow rate or pressure over time to determine a well or formation parameter; and
    automatically adjusting operating controls of the downhole electric submersible pumping system in a closed loop manner during production of the well based at least in part on the determined well or formation parameter.

16. The method as recited in claim 15, wherein analyzing comprises measuring a skin effect of the well.

17. A system for automatically testing a well installation positioned in a reservoir, comprising:
    an electric submersible pumping system positioned in a well for pumping a fluid from the well;
    at least one virtual flow rate sensor for sensing an operating parameter related to pumping the fluid from the well; and
    an automatic testing module receiving data from the at least one virtual flow rate sensor, the automatic testing module automatically adjusting operating controls of the electric submersible pumping system to introduce a transient event to the well without stopping production of the well based on the data from before and after the transient event during production of the well from the at least one virtual flow rate sensor to determine performance characteristics of the well installation and the reservoir, the automatic testing module providing a closed loop control over the operating controls to make continued adjustment based on the data received from the at least one virtual flow rate sensor.

18. The system as recited in claim 17, wherein the automatic testing module incrementally adjusts the operating controls.

19. The system as recited in claim 17, further comprising a pressure choke valve, wherein the automatic testing module incrementally adjusts the pressure choke valve during testing.

20. The system as recited in claim 17, further comprising a variable speed drive for a pump motor, wherein the automatic testing module incrementally adjusts a drive frequency for the variable speed drive during testing.

* * * * *